Sept. 8, 1936.  P. P. GROSSO  2,053,868
UNIVERSAL SELF RETAINING RETRACTOR
Filed Jan. 9, 1934   2 Sheets-Sheet 1

INVENTOR.
Patrick P. Grosso

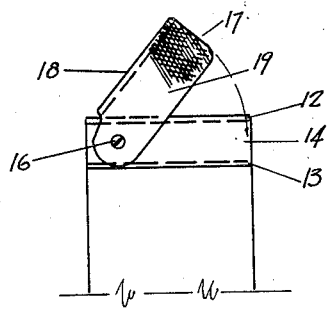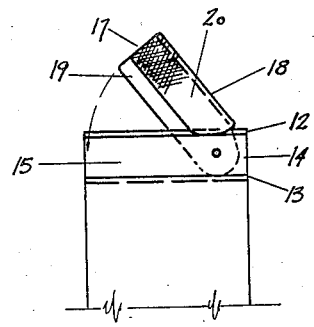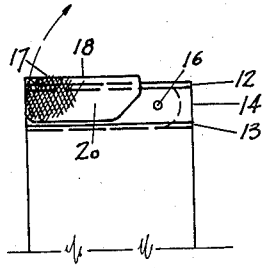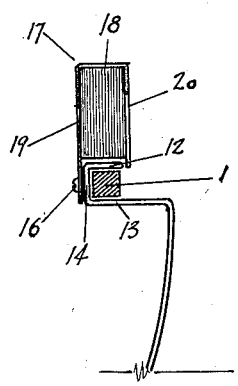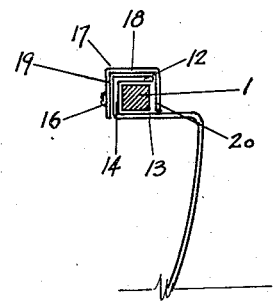

Patented Sept. 8, 1936

2,053,868

UNITED STATES PATENT OFFICE 2,053,868

UNIVERSAL SELF-RETAINING RETRACTOR

Patrick P. Grosso, Brooklyn, N. Y.

Application January 9, 1934, Serial No. 705,882

4 Claims. (Cl. 128—20)

This invention relates to surgical instruments, and has particular reference to self-retaining retractors.

An object of the invention resides in the provision of means whereby the instrument is adjustable and can be used for any size opening, ranging from one to nine inches in diameter or any fraction thereof.

Another object of the invention resides in the provision of means whereby the blades are demountable and interchangeable, and by means of which various size and shape blades may be changed and substituted, to conform with the tissues or structures that are to be retracted.

A further object resides in the provision of means whereby the instrument is simple in construction, yet sturdy and strong, and easy to manipulate, also easy to clean.

A further object resides in the provision of means whereby no handles or projecting parts form part of the instrument which tend to hinder the surgeon's operative procedure, or obstruct and obscure the field of operation.

A further object resides in the provision of means whereby a ratchet like device is provided and attached to one of the corners of the frame of the retractor, so as to allow only spreading apart motion when the ratchet is engaged, and only upon release of the ratchet can the retractor be brought to a closed position.

A further object resides in the provision of means whereby the frame of the retractor consists of four bars of steel or a suitable metal, about six inches long and one-quarter inch square, these bars are slightly curved at one end and dovetailed hinged to their respective members, forming a quadrilateral frame with opposite rounded corners.

A further object resides in the provision of means whereby the upper portions of the blades are grooved to fit the bars, and made to slide along the length of the frame.

A further object resides in the provision of means whereby the blades cannot slip off the frame, this is accomplished or provided for by means of a clamp-like device which is attached by a pivot on the upper border of the blade, and acts as a cover when pressed down.

A further object of the invention resides in the particular construction and arrangement of parts which are hereinafter described and claimed and shown in the accompanying drawings.

The invention is illustrated in the drawings of which:

Figures 5, 6, 7, 8 and 9, are views of the upper portion of the blades, showing the cover like clamp device.

Figure 1:
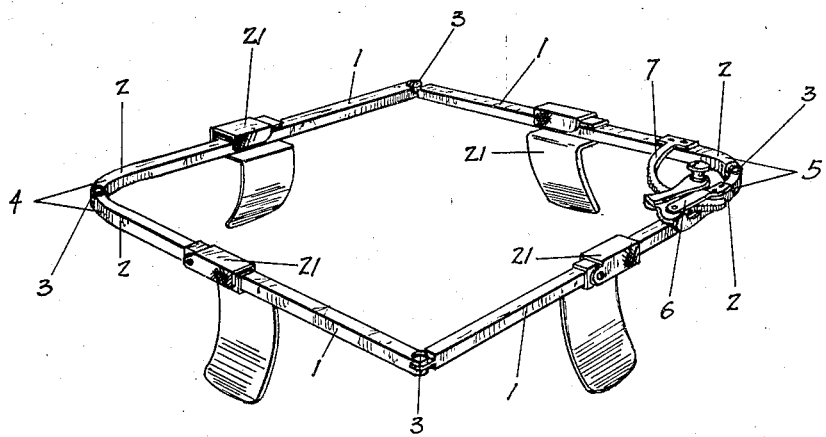
Figure 1 is a general view of the retractor in opened position, with a set of blades attached.

The form of invention shown in the drawings is a preferred application of the invention, although it is understood that modifications in the construction and arrangements of the parts and in the character of the materials used may be adopted without departing from the spirit of the invention.

The invention is particularly applicable to surgical instruments ordinarily called, self-retaining retractors, used in surgical operations where it is essential that certain structures or tissues are to be held back and away from the operative field, in order that the surgeon may perform his work, on a particular organ, or structure without obstruction.

In carrying out my invention, I provide a frame 1, consisting of four square bars about six inches long, slightly curved at one end 2, preferably made of steel or some other hard metal, nickel or chrome plated, these bars are dovetailed hinged at 3, to their respective members, forming a quadrilateral frame with two opposite corners 4 and 5 rounded. Referring to Figure 3 it will be observed that the pair of bars 1—1 are correspondingly rounded or curved at 5—5, the curvature of each of the said bars 1—1 being in the opposite direction, so that each of said bars 1—1 (Figure 3) may be described as correspondingly oppositely curved. Similarly another pair of bars 1—1 are correspondingly bent or curved as at 4—4 (Figure 2), the degree of curvature of each of said bars being equal but in opposite directions. When the curved ends 5—5 of the bars 1—1 (Figure 3) are hinged together at 3, said pair of bars form a U-shaped framework. Similarly when the curved ends 4—4 of the other pair of bars 1—1 are hinged together at 3, they likewise form a U-shaped framework. The straight or open ends of these two U-shaped frames may be hinged together as shown in Figure 2 to form a closed quadrilateral adjustable framework (compare Figures 2 and 1).

On the upper surface of one of the rounded corners 5, is attached a ratchet device 6, consisting of an arm 7 which is rigidly mounted on the upper surface of one of the bars 1 that form the frame, and about one inch away from joint 3, the arm 7 is semi-circular, the convex border being provided with fine teeth 8, which are adapted to mesh with cam 9 when engaged, cam 9 is pivotally mounted on the upper surface of the opposite bar 1 the same distance away from joint 3, cam 9 is also provided with fine teeth to mesh with arm 7 when engaged, cam 9 is excentrally and pivotally mounted, extending from it is a short lever which is provided with a knob 10, rigidly mounted on the outer surface of the bar 1, and about one half inch away from joint 3 is leaf spring 11 which holds cam 9 either in engaged position or disengaged with arm 7.

In carrying out my invention I also provide several sets of blades 21, consisting of an upper and lower portion, the upper portion Figures 5, 6, 7, 8, 9, having three sides, superior, 12, inferior 13 and lateral 14, forming groove 15, said groove 15 consisting of three sides, forms three quarters of the sleeve which is adapted to fit snugly, and slide across the length of bars 1.

A pin 16 having an enlarged head, is rigidly mounted on side 14. A cover 17 having three sides; superior 18, and two lateral respectively 19 and 20. Side 19 is pivotally mounted on pin 16. When cover 17 is closed, sides 19 and 14 are parallel and adjacent to each other, sides 18, and 12 are also parallel and adjacent, while side 20, forms the side that is wanting thereby completing the sleeve which is adapted to fit snugly, and slide across length of bars 1. When cover 12 is elevated, the lower border of side 20, is on a level with side 12, thereby allowing clearance for the admission of bar 1 into groove 15.

The lower portion of the blades is more or less of the conventional type used in ordinary hand retractors.

From the foregoing description of the various parts of the surgical instrument, the operation thereof may be readily understood. The instrument with the several sets of blades is sterilized in the usual manner, the surgeon selects the blades which he thinks will conform to the depth of the wound and the structures he intends to retract, by grasping sides 19 and 20 between thumb and index finger, cover 17 which is pivotally mounted on pin 16 is elevated, thus permitting admission bar 1 into groove 15, the blade is mounted on the frame, cover 17 is pressed down, thus holding blade from slipping off.

Knob 10 is moved inwardly, disengaging mesh formed between teeth 8, on arm 7, and teeth on cam 9, frame can thereby be brought to a closed position, whereby bars 1 forming the frame, are then parallel and about one and one-half inches apart, knob 10 is moved outwardly, thereby engaging mesh formed between teeth 8 and teeth on cam 9. Leaf spring 11 serves to hold ratchet in either engaged or disengaged position.

The instrument is ready for use and placed in the wound, with the lower portion of the blades against the tissues that are to be retracted, the frame is grasped at the opposite sides and spread apart, the blades are slid across the bars 1 that form the frame, to the desired position, a little more traction is made on the frame, so that the tension exerted by the retracted tissues which tend to come together, holds the blades securely in the said position.

Figure 2:
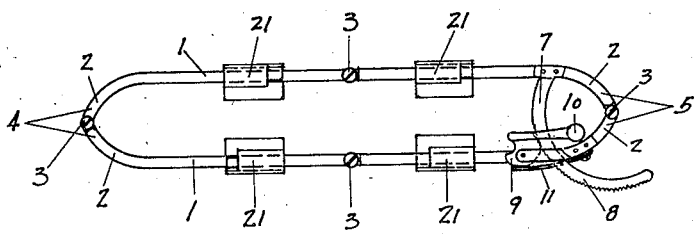
Figure 2 is the top plan view of the frame with the blades in closed position.
Figure 3:
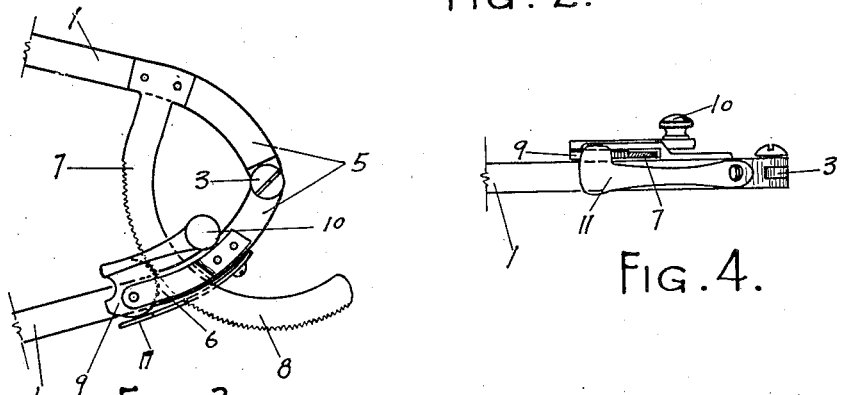
Figure 3 is the full size plan of top of the rounded corner of the frame, with ratchet device.
Figure 4:
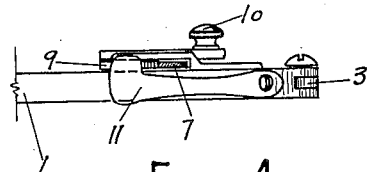
Figure 4 is a side view of the ratchet and one of the dovetailed joints.

It should be understood that where the orifice is large requiring the retraction of considerable tissue, the instrument may be used as shown in Figures 1 and 2. On the other hand, where the orifice or the incision is comparatively small, the amount of tissue to be retracted may render the use of the quadrilateral frame unnecessary; in such cases the pair of bars 1—1 correspondingly oppositely curved at 4—4, and which are shown in the left half of Figure 2 may be separated at their straight ends from the straight ends of the pair of bars 1—1 shown in the right half of Figure 2 (see also Figure 3), and the latter pair of bars equipped with the semi-circular arm 7 and ratchet device 6 may be used alone. This arrangement renders the instrument more readily adaptable either to large or small orifices. The expression "orifice" is used broadly to include not only natural body orifices, but also incisions and wounds.

What is claimed is:

1. In a surgical retractor and in combination, a series of four bars uniform in cross section arranged end to end, hinged joints between adjacent ends of each of said bars, said hinge-jointed bars forming a collapsible closed framework with angularly adjustable sides, a series of curved blades operable to distend a body orifice by engaging and separating the muscular tissue constituting the walls thereof, the upper end of each of said blades being provided with a U-shaped channel and pivoted cover therefor, said channel and cover being jointly operable to interchangeably demountably mount said blades upon said closed framework, said mounted blades being longitudinally slidably adjustable along said bars to fit orifices of various sizes, all of said bars being angularly adjustable to effect progressively increasing separation of the mounted blades and of the muscular tissue engaged thereby to exert increasing tension upon said blades thereby locking said blades to said bars, and means co-acting with certain of the bars to lock said framework against premature contraction.

2. A demountable surgical retractor blade having a lower curved portion for engaging the muscular tissue of a body orifice, the upper portion of said blade being bent to define a longitudinal channel for hooking around a section of the retractor frame, and a cover pivotally mounted relative to said channel and operable to close the mouth of said channel to retain said blade in mounted position relative to said retractor frame.

3. A surgical retractor comprising, a pair of bars, said bars being straight at one end and correspondingly oppositely curved at the other, said curved ends being pivotally connected together to render said bars angularly adjustable, a plurality of curved blades, each blade being bent at one end to define a channel large enough to slidably receive either of said bars whereby the blades are interchangeably demountably mounted upon the said bars, each blade having a hinged cover cooperating with the channel to secure the blade to the bar, said mounted blades being longitudinally slidably adjustable along said bars to fit body orifices of different sizes and said bars being thereafter angularly adjustable to effect progressively increasing separation of the mounted blades and of the muscular tissue engaged thereby to distend the orifice thereby increasing tension upon said blades and locking said blades to said bars, and means coacting with the bars to lock said bars against premature contraction.

4. A surgical retractor comprising, a pair of bars, said bars being straight at one end and correspondingly oppositely curved at the other, said curved ends being pivotally connected together to render said bars angularly adjustable, a plurality of curved blades, each blade being bent at the upper end to define a longitudinal channel large enough to slidably receive either of said bars whereby the blades are interchangeably demountably mounted upon said bars, each blade having a hinged cover cooperating with the walls of the channel to secure the blade to the bar, said mounted blades being longitudinally slidably adjustable on said bars to fit body orifices of different sizes and rockably movable about said bars to lock the blades to the bars, said bars being angularly adjustable to effect progressively increasing separation of the mounted blades thereby distending the orifice, said blades rocking responsive to the increasing tension exerted upon them by the walls of the distended orifice to lock the blades to the bars, and means co-acting with the bars to lock said bars and the blades carried thereby against premature contraction.

PATRICK P. GROSSO.